US006983912B2

(12) United States Patent
Connelly et al.

(10) Patent No.: US 6,983,912 B2
(45) Date of Patent: Jan. 10, 2006

(54) HYBRID EXHAUST HEAT SHIELD FOR PYLON MOUNTED GAS TURBINE ENGINES

(75) Inventors: Thomas J. Connelly, Bellevue, WA (US); Michael L. Sangwin, Lake Stevens, WA (US); Michael W. Su, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/136,817

(22) Filed: Apr. 30, 2002

(65) Prior Publication Data

US 2003/0201366 A1    Oct. 30, 2003

(51) Int. Cl.
    *B64C 1/00*    (2006.01)
(52) U.S. Cl. .................. 244/121; 244/119; 244/54; 244/53 R
(58) Field of Classification Search ............... 60/39.11, 60/39.091; 244/54, 121, 53 R
    See application file for complete search history.

(56) References Cited

U.S. PATENT DOCUMENTS

| | | | | |
|---|---|---|---|---|
| 4,124,732 A | * | 11/1978 | Leger | ........................ 244/121 |
| 4,712,750 A | * | 12/1987 | Ridgwell | .................... 244/121 |
| 4,811,793 A | * | 3/1989 | Lokken | ...................... 244/121 |
| 4,925,134 A | * | 5/1990 | Keller et al. | |
| 4,947,174 A | * | 8/1990 | Lehman et al. | ............. 244/121 |
| 5,110,069 A | * | 5/1992 | Webb | |
| 5,755,092 A | * | 5/1998 | Dessale et al. | |
| 5,887,822 A | * | 3/1999 | Thornock et al. | ............. 244/54 |
| 5,906,097 A | * | 5/1999 | Hebert et al. | .................. 244/54 |
| 5,910,094 A | * | 6/1999 | Kraft et al. | ............. 60/39.091 |
| 5,979,826 A | * | 11/1999 | Brown et al. | ............... 244/121 |
| 6,138,949 A | * | 10/2000 | Manende et al. | ........... 244/121 |

* cited by examiner

*Primary Examiner*—Michael J. Carone
*Assistant Examiner*—L. Semunegus
(74) *Attorney, Agent, or Firm*—Black Lowe & Graham, PLLC

(57) ABSTRACT

The present invention is a hybrid engine exhaust heat shield assembly that includes a plurality of sections. The plurality of sections include one or more sections formed of titanium (or other high heat resistant material) by a casting process, and one or more sections formed of another heat resistant material produced in a manner other than a casting process. The plurality of sections are aerodynamically shaped for thermal protection of the aft pylon. The other heat resistant material is titanium (or other high heat resistant material) that is formed by a hot formed process, or by a super plastically-formed process. The one or more sections formed by the casting process includes heat (plume) deflector flanges.

9 Claims, 4 Drawing Sheets

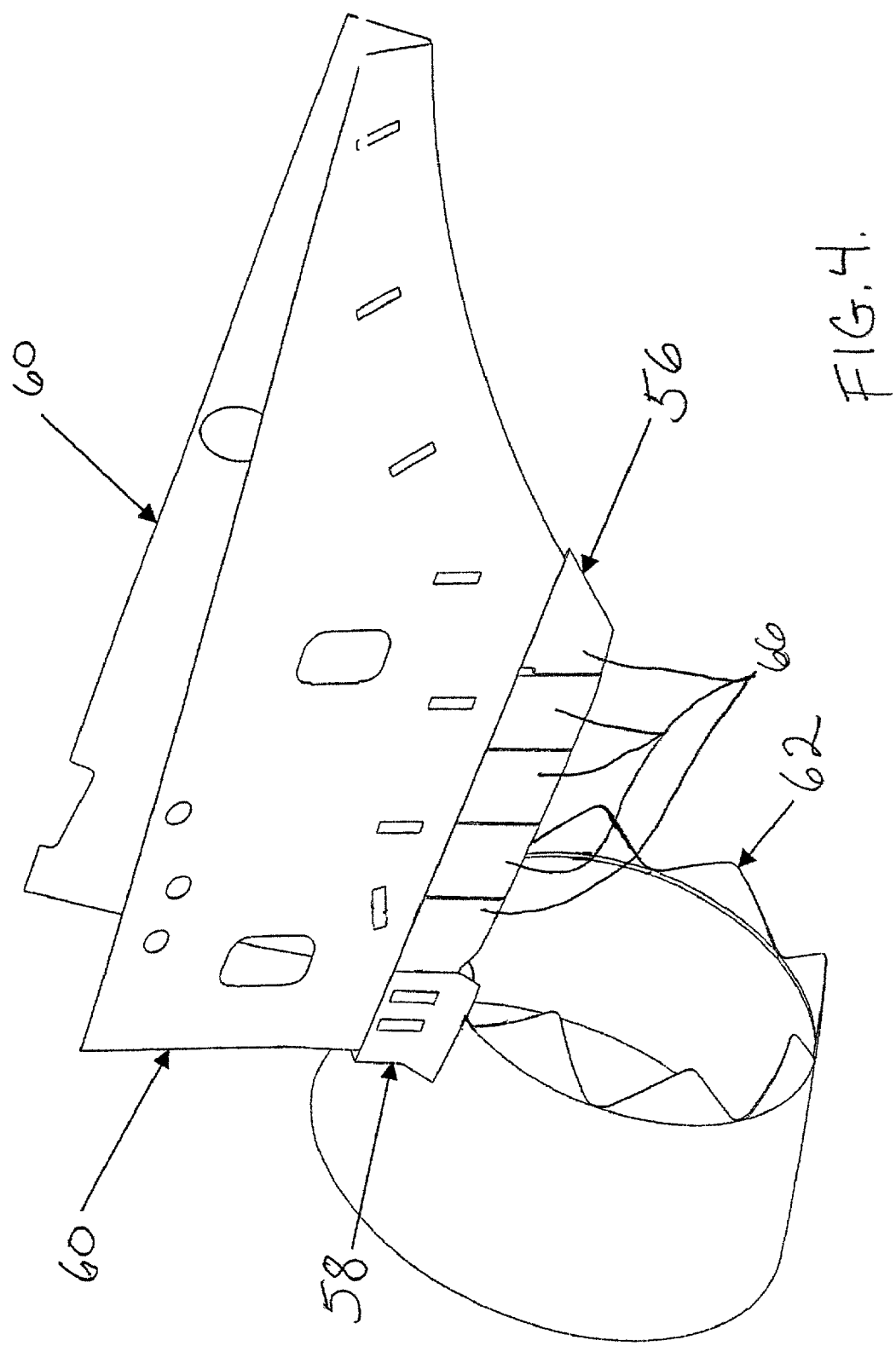

HYBRID EXHAUST HEAT SHIELD FOR PYLON MOUNTED GAS TURBINE ENGINES

FIELD OF THE INVENTION

This invention relates generally to pylon mounted gas turbine engines and, more specifically, to exhaust heat shields for pylon mounted gas turbine engines.

BACKGROUND OF THE INVENTION

Many wing mounted, gas turbine/turbo fan jet engines are mounted on a pylon underneath the wing, such as that shown in FIG. 1. Because the engine is positioned for the optimum overall performance and operation of the aircraft and propulsion systems, the fan and primary nozzle exhausts of the engine are, very often, located under the wing. The pylon that supports the engine must be designed in order to minimize drag of the propulsion systems and the airplane. The pylon and sometimes wing, must be protected from the high heat generated by the primary nozzle exhaust with heat shields. Heat shields are positioned at the bottom of the aft portion of the pylon (aft pylon) and above the primary nozzle exhaust. Some heat shields are constructed of sheet metal, such as INCONEL.

When titanium became more available, titanium heat shields that were made using a titanium casting process replaced the sheet metal heat shields. FIG. 2 illustrates a cast metal heat shield assembly 10 that is mounted to the underside of an aft pylon assembly extending aft from approximately the exit of the primary nozzle of the turbo fan engine. The heat shield assembly 10 includes four components 12, 14, 16, and 18 that are all made of titanium and are produced by a titanium casting process. In the prior art example shown in FIG. 2, the component 12 is located closest to the primary nozzle exit and components 12, 14, and 16 are all designed with plume deflectors 20, 22, and 24. The plume deflectors 20, 22, and 24 are flanges located along the bottom corner edges of the components 12, 14, and 16. The components 12, 14, and 16 are designed in order to optimize aerodynamic performance with respect to the wing and airflow produced by the engine, i.e., the fan exhaust and the primary nozzle exhaust. The plume deflectors 20, 22, and 24 are designed (and shaped) to keep the primary nozzle exhaust and its high heat from reaching the portion of the aft pylon surface that is constructed of "low temperature resistant" material such as aluminum and/or composite. Because the prior art heat shield assembly 10 is made of titanium and formed by a titanium casting process, the cost of each heat shield assembly is very expensive due to the large number of complex steps required in the titanium casting process. The titanium is lighter in weight, strong, and very resistant to high heat. However, the cost of creating a cast titanium heat shield assembly is about two times more expensive than a comparable prior art sheet metal heat shield.

Therefore, to significantly reduce the recurring cost of the engine installation, there exists a need for heat shields having the lightweight and heat resistant qualities of a cast titanium heat shield at a production cost closer to that of a sheet metal heat shield.

SUMMARY OF THE INVENTION

The present invention provides a strong, light weight heat shield assembly with a production cost significantly below that of heat shields that are all produced by a titanium casting process. The exhaust heat shield includes a plurality of sections. The plurality of sections include one or more sections formed of titanium by a titanium casting process, and one or more sections formed of a heat resistant material produced in a manner other than a titanium casting process. The plurality of sections are aerodynamically shaped and validated to prevent the hot engine exhaust flow from overheating the portion of an aft pylon made of a low heat resistant material.

The heat resistant material is titanium that is formed by a hot formed process, or by a super plastically-formed process.

The one or more sections formed by the titanium casting process includes heat deflector flanges. The one or more sections, formed of a heat resistant material produced in a manner other than a titanium casting process, may or may not include heat (plume) deflector flanges.

BRIEF DESCRIPTION OF THE DRAWINGS

The preferred and alternative embodiments of the present invention are described in detail below with reference to the following drawings.

FIG. 4 is a perspective view of the rear quarter of the present invention mounted in place in an aircraft.

DETAILED DESCRIPTION OF THE INVENTION

The present invention provides an improved and cost effective heat shield assembly for protecting a wing engine pylon from the high heat incurred from the primary nozzle of a gas turbine engine mounted to the pylon while providing proper aerodynamic performance.

Figure 1:
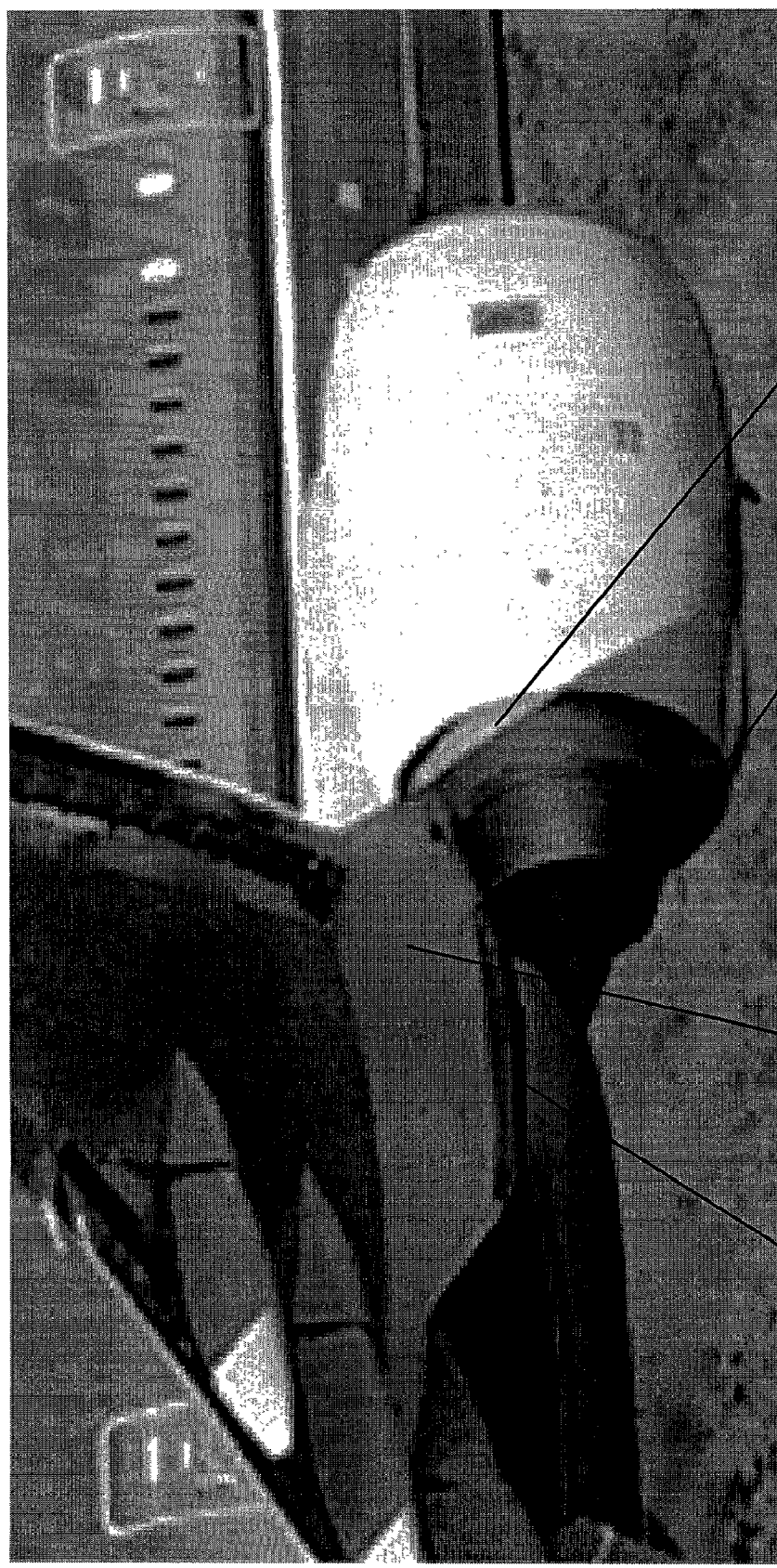
FIG. 1 is a perspective view of a prior art pylon and heat shield assembly.
Figure 2:
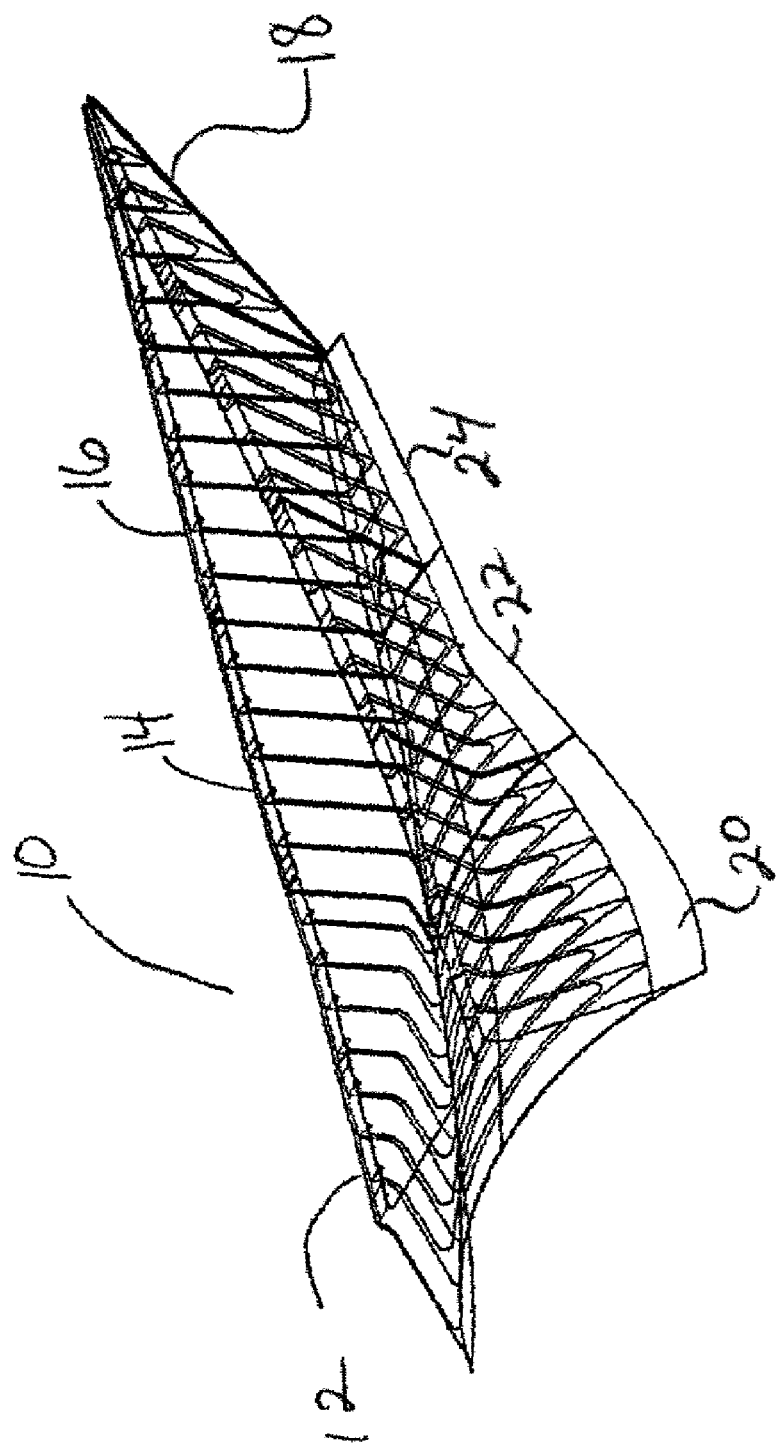
FIG. 2 is an X-ray perspective view of the prior art of all titanium-casting heat shield assembly.
Figure 3:
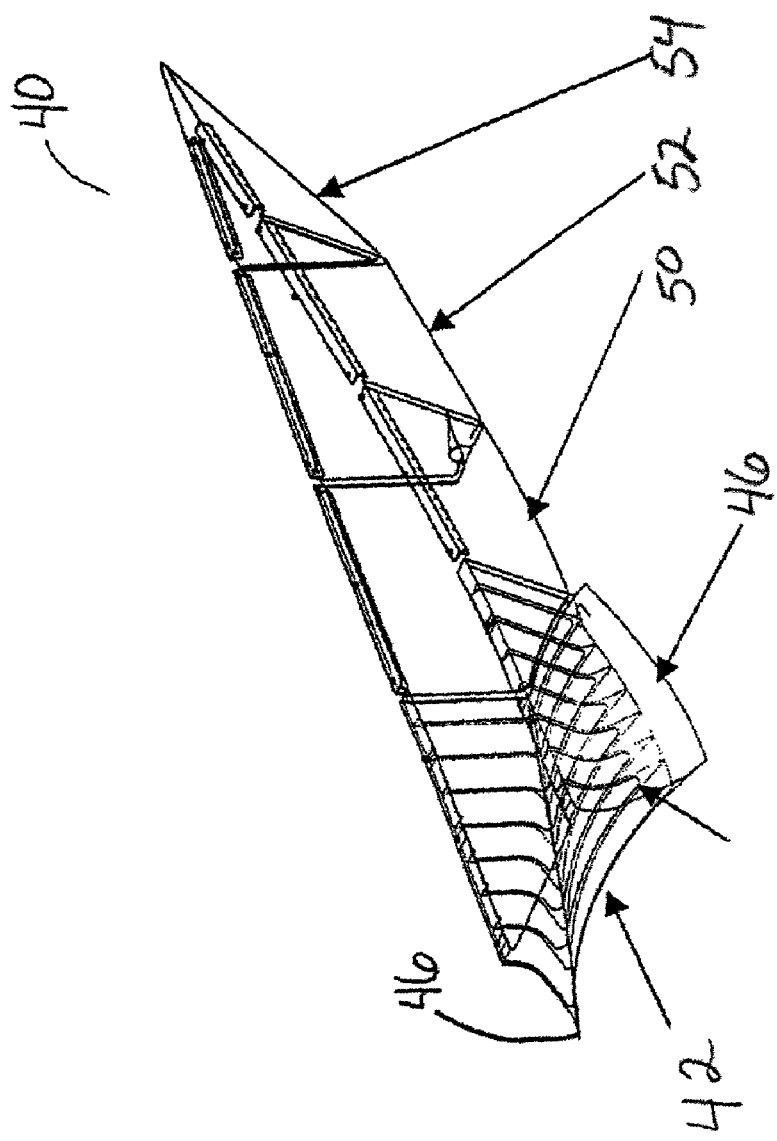
FIG. 3 is an X-ray perspective view of the heat shield assembly formed in accordance with the present invention.

FIG. 3 illustrates a perspective x-ray view of a non-limiting example heat shield assembly 40 formed in accordance with the present invention. In this non-limiting example, the heat shield assembly 40 includes first, second, third, and fourth sections 42, 50, 52, and 54. The first section 42 is secured to an engine pylon (not shown) closest to the primary nozzle exhaust (not shown). The relative position of the heat shield assembly 40 to the engine and pylon is displayed in more detail below in FIG. 4. The first section 42 is a titanium heat shield element that is suitably created by the titanium casting process, that is the same process that is used to produce all of the components of the prior art heat shield assembly 10. The first section 42 also includes plume deflectors 46 positioned on the bottom outer edges of the first section 42. The second, third, and fourth sections 50, 52, and 54 of the heat shield 40 are located aft of the first section 42 and are made of heat resistant materials not made using the titanium casting process. Advantageously, the second, third, and fourth sections 50, 52, and 54 are suitably made of a material that provides adequate thermal protection of the pylon (not shown) without the need for plume deflectors. In non-limiting examples, the second, third, and fourth sections 50, 52, and 54 are suitably constructed from titanium by a hot formed process or a super plastically-formed (SPF) process. The aerodynamic contours (shapes) of the heat shield sections 42, 50, 52, and 54 and of the plume deflectors 46 are achieved based on aerodynamic principles, testing, and/or analysis to minimize aerodynamic drag whilst preventing the migration of high temperature exhaust flow onto aft pylon surfaces that do not have adequate thermal protection (resistance). Additional features of these contours may include, but are not limited to, flow control fences, vortex generators, and other such "add-on" devices, which are strategically located to favorably (minimizing) affect the thermal field.

In other non-limiting examples, the second, third, and fourth sections 50, 52, and 54 are formed out of appropriate heat resistant material, including an austenitic nickel-chromium-iron alloy such as INCONEL, or out of a combination of heat resistant materials other than titanium formed by the titanium casting process, such as titanium and INCONEL.

FIG. 4 illustrates a non-limiting example of a heat shield assembly 56 that includes six sections with a first section 58, formed of titanium by a titanium casting process similar to the first section 42 (FIG. 3) with plume deflectors and an additional five sections 66, formed similar to that of the second, third, and fourth sections 50, 52, and 54 (FIG. 3). The heat shield assembly 56 is positioned at or near the primary nozzle exhaust 62. The heat shield assembly 56 is attached by various attachment mechanisms known in the art to an aft pylon assembly structure 60. The sections of the heat shield assembly 56 are attached to each other by an overlapping seam or other attachment mechanisms known in the art that allow for longitudinal thermal expansion of these sections. The additional five sections 66 are suitably constructed without plume deflectors.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A method comprising: forming one or more first parts of a first high heat resistant material by a casting process; forming one or more second parts of a second high heat resistant material using a process other than a casting process, by deforming the second high heat material into a desired aerodynamic contour; and attaching to an aircraft pylon.

2. The method of claim 1, further comprising attaching the formed parts to an aft pylon.

3. The method of claim 1, wherein the first high heat resistant material is titanium.

4. The method of claim 1, wherein the second high heat resistant material is titanium.

5. The method of claim 2, wherein deforming the second high heat material into a desired aerodynamic contour includes deforming the second high heat material using a hot forming process.

6. The method of claim 2, wherein deforming the second high heat material into a desired aerodynamic contour includes deforming the second high heat material using a super plastic forming process.

7. The method of claim 1, wherein one or more of the parts include a heat plume deflector flange.

8. The method of claim 1, wherein the parts are aerodynamically shaped.

9. The method of claim 1, wherein forming one or more second parts of a second high heat resistant material further comprises forming the one or more second parts of an austenitic nickel-chromium-iron alloy.

* * * * *